US007991385B1

(12) United States Patent
Rosenberg et al.

(10) Patent No.: US 7,991,385 B1
(45) Date of Patent: Aug. 2, 2011

(54) SYSTEM AND METHOD FOR NETWORK CHARGING USING POLICY PEERING

(75) Inventors: Jonathan D. Rosenberg, Freehold, NJ (US); Flemming S. Andreasen, Marlboro, NJ (US)

(73) Assignee: Cisco Technology, Inc., San Jose, CA (US)

( * ) Notice: Subject to any disclaimer, the term of this patent is extended or adjusted under 35 U.S.C. 154(b) by 81 days.

(21) Appl. No.: 11/715,256

(22) Filed: Mar. 6, 2007

Related U.S. Application Data

(60) Provisional application No. 60/780,176, filed on Mar. 6, 2006.

(51) Int. Cl.
*H04W 4/00* (2009.01)

(52) U.S. Cl. ..... 455/406; 455/407; 455/405; 455/432.1; 370/328; 370/329; 370/338; 709/228

(58) Field of Classification Search .................. 455/406, 455/452.1, 405, 407, 432.1; 370/328, 329, 370/338; 709/228
See application file for complete search history.

(56) References Cited

U.S. PATENT DOCUMENTS

| | | | |
|---|---|---|---|
| 5,602,907 A | 2/1997 | Hata et al. | 379/114 |
| 5,822,411 A | 10/1998 | Swale et al. | 379/111 |
| 5,828,737 A | 10/1998 | Sawyer | 379/114 |
| 5,905,736 A | 5/1999 | Ronen et al. | 370/546 |
| 5,909,238 A | 6/1999 | Nagashima et al. | 348/3 |
| 5,946,670 A | 8/1999 | Motohashi et al. | 705/400 |
| 5,956,391 A | 9/1999 | Melen et al. | 379/114 |
| 5,970,477 A | 10/1999 | Roden | 705/32 |
| 5,987,498 A | 11/1999 | Athing et al. | 709/203 |
| 6,016,509 A | 1/2000 | Dedrick | 709/224 |
| 6,035,281 A | 3/2000 | Crosskey et al. | 705/14 |
| 6,047,051 A | 4/2000 | Ginzboorg et al. | 379/130 |
| 6,070,192 A | 5/2000 | Holt et al. | 709/227 |
| 6,075,854 A | 6/2000 | Copley et al. | 379/211 |
| 6,131,024 A | 10/2000 | Boltz | 455/405 |
| 6,137,791 A | 10/2000 | Frid et al. | 370/352 |
| 6,141,684 A | 10/2000 | McDonald et al. | 709/222 |

(Continued)

FOREIGN PATENT DOCUMENTS

WO    WO 98/26381    6/1998

(Continued)

OTHER PUBLICATIONS

PCT Notification of Transmittal of the International Search Report and the Written Opinion of the International Searching Authority, or the Declaration with attached PCT International Search Report and Written Opinion of the International Searching Authority in International Application No. PCT/US 07/05937, dated Oct. 25, 2007, 6 pages.

(Continued)

*Primary Examiner* — Pierre-Louis Desir
(74) *Attorney, Agent, or Firm* — Baker Botts L.L.P.

(57) ABSTRACT

A method for optimizing service-based billing in a network environment is provided that includes interfacing, by a home policy server residing in a home network of an end user, with a visited policy server in a visited network and with an application server, the application server contacting the home policy server when the end user elects to invoke an application in the home network, the application server contacting the home policy server and passing a set of application descriptors to the policy server, the application descriptors being tokens that describe one or more characteristics of the application for charging.

23 Claims, 3 Drawing Sheets

U.S. PATENT DOCUMENTS

| | | |
|---|---|---|
| 6,175,879 B1 | 1/2001 | Shah et al. ............... 709/330 |
| 6,208,977 B1 | 3/2001 | Hernandez et al. ............ 705/34 |
| 6,229,887 B1 | 5/2001 | Albers et al. .............. 379/219 |
| 6,282,573 B1 | 8/2001 | Darago et al. ............. 709/229 |
| 6,295,447 B1 | 9/2001 | Reichelt et al. ............ 455/417 |
| 6,330,562 B1 | 12/2001 | Boden et al. ............... 707/10 |
| 6,332,163 B1 | 12/2001 | Bowman-Amuah ........ 709/231 |
| 6,339,832 B1 | 1/2002 | Bowman-Amuah .......... 714/35 |
| 6,434,568 B1 | 8/2002 | Bowman-Amuah ..... 707/103 R |
| 6,434,628 B1 | 8/2002 | Bowman-Amuah .......... 714/48 |
| 6,438,594 B1 | 8/2002 | Bowman-Amuah ........ 709/225 |
| 6,442,748 B1 | 8/2002 | Bowman-Amuah ........ 717/108 |
| 6,466,964 B1 | 10/2002 | Leung et al. ............... 709/202 |
| 6,477,580 B1 | 11/2002 | Bowman-Amuah ........ 709/231 |
| 6,477,665 B1 | 11/2002 | Bowman-Amuah .......... 714/39 |
| 6,480,485 B1 | 11/2002 | Kari et al. ................. 370/352 |
| 6,490,451 B1 | 12/2002 | Denman et al. ............ 455/436 |
| 6,493,547 B1 | 12/2002 | Raith ........................ 455/405 |
| 6,496,850 B1 | 12/2002 | Bowman-Amuah ........ 709/203 |
| 6,502,213 B1 | 12/2002 | Bowman-Amuah .......... 714/49 |
| 6,510,513 B1 | 1/2003 | Danieli ...................... 713/156 |
| 6,529,909 B1 | 3/2003 | Bowman-Amuah ........... 707/10 |
| 6,529,948 B1 | 3/2003 | Bowman-Amuah ........ 709/217 |
| 6,539,396 B1 | 3/2003 | Bowman-Amuah ..... 707/103 R |
| 6,549,949 B1 | 4/2003 | Bowman-Amuah ........ 709/236 |
| 6,550,057 B1 | 4/2003 | Bowman-Amuah ........ 717/126 |
| 6,571,282 B1 | 5/2003 | Bowman-Amuah ........ 709/219 |
| 6,578,068 B1 | 6/2003 | Bowman-Amuah ........ 709/203 |
| 6,601,192 B1 | 7/2003 | Bowman-Amuah .......... 714/38 |
| 6,601,234 B1 | 7/2003 | Bowman-Amuah ........ 717/108 |
| 6,606,660 B1 | 8/2003 | Bowman-Amuah ........ 709/227 |
| 6,611,821 B2 | 8/2003 | Stahl et al. ................. 705/400 |
| 6,615,199 B1 | 9/2003 | Bowman-Amuah .......... 706/50 |
| 6,615,253 B1 | 9/2003 | Bowman-Amuah ........ 709/219 |
| 6,615,263 B2 | 9/2003 | Dulai et al. ................ 709/225 |
| 6,621,820 B1 | 9/2003 | Williams et al. ........ 370/395.31 |
| 6,636,242 B2 | 10/2003 | Bowman-Amuah ........ 715/764 |
| 6,640,238 B1 | 10/2003 | Bowman-Amuah ........ 709/201 |
| 6,640,244 B1 | 10/2003 | Bowman-Amuah ........ 709/207 |
| 6,647,262 B1 | 11/2003 | Demetrescu et al. ....... 455/436 |
| 6,665,537 B1 | 12/2003 | Lioy .......................... 455/435 |
| 6,665,718 B1 | 12/2003 | Chuah et al. ............... 709/225 |
| 6,671,510 B1* | 12/2003 | Kelly et al. ................. 455/445 |
| 6,671,675 B2 | 12/2003 | Iwamura .................... 705/30 |
| 6,684,243 B1 | 1/2004 | Euget et al. ................ 709/222 |
| 6,684,256 B1 | 1/2004 | Warrier et al. ............. 709/238 |
| 6,708,225 B1 | 3/2004 | Cho et al. .................. 709/317 |
| 6,714,515 B1 | 3/2004 | Marchand .................. 370/231 |
| 6,715,145 B1 | 3/2004 | Bowman-Amuah ........ 718/101 |
| 6,725,036 B1 | 4/2004 | Faccin et al. .............. 455/433 |
| 6,728,266 B1 | 4/2004 | Sabry et al. ................ 370/468 |
| 6,728,365 B1 | 4/2004 | Li et al. ..................... 379/329 |
| 6,728,884 B1 | 4/2004 | Lim .......................... 713/201 |
| 6,742,015 B1 | 5/2004 | Bowman-Amuah ........ 718/101 |
| 6,742,036 B1 | 5/2004 | Das et al. ................... 709/226 |
| 6,757,371 B2 | 6/2004 | Kim et al. ............... 379/114.22 |
| 6,760,444 B1 | 7/2004 | Leung ....................... 380/270 |
| 6,768,726 B2 | 7/2004 | Dorenbosch et al. ....... 370/331 |
| 6,769,000 B1 | 7/2004 | Akhtar et al. .......... 707/103 R |
| 6,771,623 B2 | 8/2004 | Ton ........................... 370/331 |
| 6,785,256 B2 | 8/2004 | O'Neill ...................... 370/338 |
| 6,804,518 B2 | 10/2004 | Core et al. ................. 455/436 |
| 6,826,173 B1 | 11/2004 | Kung et al. ................. 370/352 |
| 6,829,709 B1 | 12/2004 | Acharya et al. ............ 713/160 |
| 6,834,341 B1 | 12/2004 | Bahl et al. ................. 713/156 |
| 6,839,338 B1 | 1/2005 | Amara et al. .............. 370/338 |
| 6,842,906 B1 | 1/2005 | Bowman-Amuah ........ 719/330 |
| 6,854,014 B1 | 2/2005 | Amin et al. ................ 709/227 |
| 6,856,676 B1 | 2/2005 | Pirot et al. .............. 379/201.01 |
| 6,889,321 B1 | 5/2005 | Kung et al. ................. 713/153 |
| 6,907,501 B2 | 6/2005 | Tariq et al. ................. 711/118 |
| 6,910,074 B1 | 6/2005 | Amin et al. ................ 709/225 |
| 6,915,345 B1 | 7/2005 | Tummala et al. .......... 709/225 |
| 6,917,605 B2 | 7/2005 | Kakemizu et al. ......... 370/338 |
| 6,920,503 B1 | 7/2005 | Nanji et al. ................ 709/230 |
| 6,922,404 B1 | 7/2005 | Narayanan et al. ......... 370/338 |
| 6,925,160 B1 | 8/2005 | Stevens et al. ........... 379/121.05 |
| 6,947,401 B2 | 9/2005 | El-Malki et al. ........... 370/331 |
| 6,961,774 B1 | 11/2005 | Shannon et al. ............ 709/227 |
| 6,967,941 B2 | 11/2005 | Roy .......................... 370/338 |
| 6,978,128 B1 | 12/2005 | Raman et al. .............. 455/414 |
| 6,980,802 B2 | 12/2005 | Jung .......................... 455/436 |
| 6,980,962 B1 | 12/2005 | Arganbright et al. ........ 705/26 |
| 6,981,047 B2 | 12/2005 | Hanson et al. ............. 709/227 |
| 6,982,967 B1 | 1/2006 | Leung ....................... 370/328 |
| 6,990,337 B2 | 1/2006 | O'Neill et al. ........... 455/422.1 |
| 6,993,333 B2 | 1/2006 | Laroia et al. .............. 455/436 |
| 7,003,294 B2 | 2/2006 | Singhai et al. ........... 455/435.1 |
| 7,020,697 B1 | 3/2006 | Goodman et al. .......... 709/223 |
| 7,024,687 B2 | 4/2006 | Chaudhuri et al. ............ 726/3 |
| 7,028,311 B2 | 4/2006 | Roach et al. ............... 719/328 |
| 7,039,027 B2 | 5/2006 | Bridgelall .................. 370/329 |
| 7,054,268 B1 | 5/2006 | Paranteinen et al. ........ 370/231 |
| 7,079,499 B1 | 7/2006 | Akhtar et al. .............. 370/310 |
| 7,082,301 B2 | 7/2006 | Jagadeesan et al. ........ 455/436 |
| 7,103,359 B1 | 9/2006 | Heinonen et al. .......... 455/436 |
| 7,127,234 B2 | 10/2006 | Ishii .......................... 455/411 |
| 7,130,286 B2 | 10/2006 | Koodli et al. .............. 370/331 |
| 7,133,386 B2 | 11/2006 | Holur et al. ................ 370/331 |
| 7,151,758 B2 | 12/2006 | Kumaki et al. ............. 370/331 |
| 7,151,772 B1 | 12/2006 | Kalmanek et al. .......... 370/390 |
| 7,154,868 B1 | 12/2006 | Sharma et al. ............. 370/331 |
| 7,161,914 B2 | 1/2007 | Shoaib et al. .............. 370/331 |
| 7,171,555 B1 | 1/2007 | Salowey et al. ............ 713/156 |
| 7,184,418 B1 | 2/2007 | Baba et al. ................. 370/331 |
| 7,187,931 B2 | 3/2007 | Trossen ..................... 455/440 |
| 7,190,793 B2 | 3/2007 | Hsu .......................... 380/270 |
| 7,197,763 B2 | 3/2007 | Hsu .............................. 726/4 |
| 7,212,821 B2 | 5/2007 | Laroia et al. .............. 455/437 |
| 7,230,951 B2 | 6/2007 | Mizell et al. ............... 370/401 |
| 7,233,583 B2 | 6/2007 | Asthana et al. ............. 370/332 |
| 7,251,733 B2 | 7/2007 | Haverinen et al. ......... 713/182 |
| 7,263,371 B2 | 8/2007 | Das et al. ................ 455/456.1 |
| 7,269,727 B1 | 9/2007 | Mukherjee et al. ......... 713/160 |
| 7,272,122 B2 | 9/2007 | Trossen et al. ............. 370/331 |
| 7,272,123 B2 | 9/2007 | Wall ......................... 370/331 |
| 7,275,156 B2 | 9/2007 | Balfanz et al. ............. 713/168 |
| 7,389,106 B2 | 6/2008 | Dawson et al. ............ 455/406 |
| 2001/0023428 A1 | 9/2001 | Miyazaki et al. ........... 709/201 |
| 2002/0021681 A1 | 2/2002 | Madour ..................... 370/331 |
| 2002/0023174 A1 | 2/2002 | Garrett et al. .............. 709/245 |
| 2002/0036982 A1 | 3/2002 | Chen ......................... 370/230 |
| 2002/0059114 A1 | 5/2002 | Cockrill et al. .............. 705/27 |
| 2002/0091802 A1 | 7/2002 | Paul et al. .................. 709/220 |
| 2002/0138601 A1 | 9/2002 | Piponius et al. ............ 709/223 |
| 2002/0151312 A1* | 10/2002 | Rosemarijn Bos et al. ... 455/452 |
| 2003/0021252 A1 | 1/2003 | Harper et al. .............. 370/338 |
| 2003/0039237 A1 | 2/2003 | Forslow .................... 370/352 |
| 2003/0154400 A1 | 8/2003 | Pirttimaa et al. ........... 713/201 |
| 2003/0187817 A1 | 10/2003 | Agrawal et al. .............. 707/1 |
| 2003/0217165 A1 | 11/2003 | Buch et al. ................. 709/229 |
| 2004/0114553 A1 | 6/2004 | Jiang et al. ................. 370/328 |
| 2004/0162876 A1 | 8/2004 | Kohavi ...................... 709/203 |
| 2004/0162892 A1 | 8/2004 | Hsu .......................... 709/221 |
| 2004/0196821 A1 | 10/2004 | Haddad et al. ............. 370/349 |
| 2004/0210524 A1 | 10/2004 | Benenati et al. ............. 705/40 |
| 2004/0259562 A1 | 12/2004 | Madour ................... 455/452.2 |
| 2005/0002407 A1 | 1/2005 | Shaheen et al. ............ 370/401 |
| 2005/0025132 A1 | 2/2005 | Harper et al. .............. 370/352 |
| 2005/0130659 A1 | 6/2005 | Grech et al. ............... 455/436 |
| 2005/0149651 A1 | 7/2005 | Doak et al. .................. 710/52 |
| 2005/0176428 A1 | 8/2005 | Gabor et al. ............. 455/435.1 |
| 2005/0195766 A1 | 9/2005 | Nasieiski et al. ........... 370/331 |
| 2005/0201324 A1 | 9/2005 | Zheng ....................... 370/328 |
| 2005/0213606 A1 | 9/2005 | Huang et al. ............... 370/467 |
| 2005/0220039 A1 | 10/2005 | Hoshino et al. ............ 370/261 |
| 2005/0278420 A1 | 12/2005 | Hartikainen et al. ........ 709/203 |
| 2005/0286709 A1 | 12/2005 | Horton et al. ........... 379/265.09 |
| 2006/0014547 A1 | 1/2006 | Walter .................... 455/456.1 |
| 2006/0018272 A1 | 1/2006 | Mutikainen et al. ........ 370/328 |
| 2006/0077924 A1 | 4/2006 | Rune ........................ 370/328 |
| 2006/0116113 A1 | 6/2006 | Gass ...................... 455/414.4 |
| 2006/0126630 A1 | 6/2006 | Shirazipour et al. ........ 370/392 |
| 2006/0171310 A1 | 8/2006 | Ahluwalia et al. .......... 370/229 |
| 2006/0251038 A1 | 11/2006 | Tamura et al. ............. 370/342 |
| 2006/0264207 A1 | 11/2006 | Tamura et al. ............. 455/415 |
| 2006/0268819 A1 | 11/2006 | Chen et al. ................. 370/349 |

| | | | |
|---|---|---|---|
| 2007/0008882 A1 | 1/2007 | Oran | 370/229 |
| 2007/0036312 A1 | 2/2007 | Cai et al. | 379/126 |
| 2007/0086582 A1 | 4/2007 | Tai et al. | 379/114.01 |
| 2007/0094712 A1* | 4/2007 | Gibbs et al. | 726/3 |
| 2007/0121615 A1 | 5/2007 | Weill et al. | 370/389 |
| 2007/0121642 A1 | 5/2007 | Battin et al. | 370/395.2 |
| 2007/0153720 A1 | 7/2007 | Baglin et al. | 370/328 |
| 2007/0254661 A1 | 11/2007 | Chowdhury | 455/436 |

FOREIGN PATENT DOCUMENTS

| | | |
|---|---|---|
| WO | WO 99/31610 | 6/1999 |
| WO | WO 2005/107297 | 11/2005 |

OTHER PUBLICATIONS

Online Inc., "Apogee Releases Content Usage-Based Billing Product Annotated Title—Software allows content usage-based billing," EContent, vol. 24, No. 5, NDN 173-0356-6509-7, 1 pg., Jul. 2001.

Centaur Communications, "Secret Bear platform allows paid-for SMS Annotated Title—Secret Bear introduced cross-network reverse billing platform allowing content providers to charge for SMS content," New Media Age, NDN 173-0354-6130-3, 1 pg., Jun. 28, 2001.

Karsten Lüttge, "E-Charging API: Outsource Charging to a Payment Service Provider," NDN 174-0708-0924-8, pp. 216-227, 2001.

A. Herzberg, "Safeguarding Digital Library Contents: Charging for Online Content," D-Lib Magazine, NDN 174-0590-9051-8, 16 pgs., Jan. 1998.

Business Wire, "Apogee Networks Introduces Industry's First Content Usage-Based Billing Solution for Web Hosters," NDN 219-0281-6988-1, 2 pgs., May 8, 2001.

Business Wire, "Apogee Networks Announces Investment by Cisco Systems; Combined Efforts Enhance Billing Capabilities for Content Delivery Network Providers," NDN 219-0220-9035-0, 2 pgs., Jan. 23, 2001.

Business Wire, "Key Analysts Predict Content Billing is the Internet's New Frontier; Content is the Asset of the Industry; Apogee Networks Seen as the Leader in New Internet Industry Space," NDN 219-0162-6934-6, 3 pgs., Oct. 10, 2000.

Business Wire, "Apogee Networks Unveils NetCountant Wireless Billing At SUPERCOMM; Company Demonstrates Industry First Wireless Content Usage Based Billing Solution," NDN 218-0324-8075-6, 2 pgs., Jun. 5, 2001.

Business Wire, "Apogee Networks Wins 2000 Communications ASP Product of the Year Award; Apogee Networks' NetCountant Billing Takes Top Honors for Innovative Content Usage Based Billing Solutions," NDN 218-0282-3757-7, 2 pgs., Mar. 21, 2001.

Business Wire, "Wireless Internet Content Billing and Settlement Capability Announced; Companies Announce Interoperability Between WAP Gateway and Content Billing System," NDN 218-0220-0997-2, 2 pgs., Dec. 6, 2000.

Business Wire, "Apogee Networks Joins Content Alliance; Billing Expert to Join Industry Group Aimed At Advancing Content Networking," NDN 218-0181-2716-7, 3 pgs., Oct. 11, 2000.

Business Wire, "Apogee Networks, Inc. and Paysys International, Inc. to Integrate Technologies to Create Advanced IP Content Billing Solutions," NDN 218-0098-0623-9, 3 pgs., Jun. 19, 2000.

Ylitalo, et al., *Re-thinking Security in IP based Micro-Mobility*, downloaded from www.tcs.hut.fi/Studies/T-79.5401/2005AUT/ISCO4-Vlitalo-e-al.pdf (12 pages).

Draft—TR45-PN-3-4732-RV4 (to be published as TIA-835.1-D), 32 pages.

Draft—TR45-PN-3-4732-RV4 (to be published as TIA-835.2-D), 93 pages.

Draft—TR45-PN-3-4732-RV4 (to be published as TIA-835.3-D), 36 pages.

Draft—TR45-PN-3-4732-RV4 (to be published as TIA-835.4-D), 70 pages.

Draft—TR45-PN-3-4732-RV4 (to be published as TIA-835.5-D), 72 pages.

Draft—TR45-PN-3-4732-RV4 (to be published as TIA-835.6-D), 36 pages.

3GPP2 C.S0067, 3rd Generation Partnership Project 2 '3GPP2', "Generic Key Exchange Protocol for cdma2000 High Rate Packet Data Air Interface," Version 1.0, 24 pages, Nov. 2005.

3GPP2 X.S0011-001-D, 3rd Generation Partnership Project 2 '3GPP2', "cdma2000 Wireless IP Network Standard: Introduction," Version 1.0, 33 pages, Feb. 2006.

3GPP2 C.S0063-0, 3rd Generation Partnership Project 2 '3GPP2', "cdma2000 High Rate Packet Data Supplemental," Version 1.0, 127 pages, Mar. 2006.

3GPP2 A.S0008-A v.1.0, 3rd Generation Partnership Project 2 '3GPP2,' Interoperability Specification (IOS) for High Rate Packet Data (HRPD) Radio Access Network Interfaces with Session Control in the Access Network, 257 pages, Mar. 2006.

3GPP2 C.S0024-A, 3rd Generation Partnership Project 2 '3GPP2', "cdma2000 High Rate Packet Data Air Interface Specification," Version 2.0, 1,223 pages, Jul. 2005.

B. Aboba, et al., "Extensible Authentication Protocol (EAP)," Network Working Group, RFC 3748, http://www.ietf.org/rfc/rfc3748.txt, 59 pages, Jun. 2004.

B. Aboba, D. Simon, "PPP EAP TLS Authentication Protocol," Network Working Group, RFC 2716, http://www.ietf.org/rfc/rfc2716.txt, 22 pages, Oct. 1999.

W. Simpson, "PPP Challenge Handshake Authentication Protocol (CHAP)," Network Working Group, RFC 1994, http://www.ietf.org/rfc/rfc1994.txt, 12 pages, Aug. 1996.

W. Simpson, "The Point-to-Point (PPP)," Network Working Group, RFC 1661, http://www.ietf.org/rfc/rfc1661.txt, 47 pages, Jul. 1994.

P. Eronen, et al., "Diameter Extensible Authentication Protocol (EAP) Application," Network Working Group, RFC 4072, http://www.ietf.org/rfc/rfc4072.txt, 29 pages, Aug. 2005.

P. Calhoun, et al., "Diameter Base Protocol," Network Working Group, RFC 3588, http://www.ietf.org/rfc/rfc3588.txt, 129 pages, Sep. 2003.

3rd Generation Partnership Project 2 "3GPP2"; "All-IP Core Network Multimedia Domain: Service Based Bearer Control-Stage 2;www.3gpp2.org-"; Version 1.0. Draft Version 0.21.0, 49 pages, Unknown.

PCT Notification of Transmittal of the International Search Report and the Written Opinion of the International Searching Authority, or the Declaration, International Application No. PCT/US07/05847, 9 pages, Oct. 26, 2007.

PCT Notification of Transmittal of the International Search Report and the Written Opinion of the International Searching Authority, or the Declaration, International Application No. PCT/US07/05849, 9 pages, Nov. 14, 2007.

Yegani et al., "System and Method for Access Authentication in a Mobile Wireless Network," U.S. Appl. No. 11/419,382, 20 pps, 3 pps drawings (2104), Filed May 19, 2006.

Yegani et al., "System and Method for Handover of an Access Terminal in a Communication Network," U.S. Appl. No. 11/682,735, 24 pps, 3 pps drawings (2360), Filed Mar. 6, 2007.

Yegani et al., "Enforcement of User Level Policies from Visited Networks in a Mobile IP Environment," U.S. Appl. No. 11/682,817, 22 pps, 2 pps drawings (2359), Filed Mar. 6, 2007.

Yegani et al, Authentication of Access Terminals in a Cellular Communication Network,: U.S. Appl. No. 11/682,857, 28 pps, 5 pps drawings (2358), Filed Mar. 6, 2007.

Andreasen et al., "System and Method of Consolidating Accounting Data for a Communication Session," U.S. Appl. No. 11/714,974, 40 pps, 3 pps drawings (2404), Filed Mar. 6, 2007.

Panda et al., "System and Method for Capturing Accounting Data for a Communication Session," U.S. Appl. No. 11/715,018 (2402), Filed Mar. 6, 2007.

Rosenberg et al., "System and Method for Determining a Network for Processing Applications for a Communication Session," U.S. Appl. No. 11/715,019, 40 pps, 3 pps drawings (2406), Filed Mar. 6, 2007.

Rosenberg et al., "Determining a Policy Output for a Communication Session," U.S. Appl. No. 11/715,032, 31 pps, 4 pps drawings (2368), Filed Mar. 6, 2007.

Leung et al., "Communicating Packets Using a Home Anchored Bearer Path," U.S. Appl. No. 11/715,033, 33 pps, 4 pps drawings (2407), Filed Mar. 6, 2007.

Andreasen et al., "Posture-Based Network Authentication," U.S. Appl. No. 11/715,040, 23 pages, 2 pps drawings (2398), Filed Mar. 6, 2007.

Iyer et al., "Access Terminal for Communicating Packets Using a Home Anchored Bearer Path," U.S. Appl. No. 11/715,041, 33 pps, 4 pps drawings (2300), Filed Mar. 6, 2007.

Rosenberg et al., "System and Method for Exchanging Policy Information in a Roaming Communications Environment," U.S. Appl. No. 11/715,056, 42 pps, 3 pps drawings (2416), Filed Mar. 6, 2007.

Rosenberg et al., "Establishing Facets of a Policy for a Communication Session," U.S. Appl. No. 11/715,065, 32 pps, 4 pps drawings (2409), Filed Mar. 6, 2007.

Rosenberg et al., "Performing Deep Packet Inspection for a Communication Session," U.S. Appl. No. 11/715,073, 31 pps, 4 pps drawings (2400), Filed Mar. 6, 2007.

Rosenberg et al., "Assigning a Serving—CSCF During Access Authentication," U.S. Appl. No. 11/715,074, 22 pps, 2 pps drawings, (2410), Filed Mar. 6, 2007.

Rosenberg et al., "System and Method for Providing Emergency Services in a Visited Communications Environment," U.S. Appl. No. 11/715,111, 39 pps, 2 pps drawings (2418), Filed Mar. 6, 2007.

Panda et al., "Application-Aware Policy Enforcement," U.S. Appl. No. 11/715,187, 28 pps, 2 pps drawings (2403), Filed Mar. 6, 2007.

Andreasen et al., "System and Method for Generating a Unified Accounting Record for a Communication Session," U.S. Appl. No. 11/715,210, 46 pps, 3 pps drawings (2399), Filed Mar. 6, 2007.

Andreasen et al., "Network-triggered quality of service (QoS) Reservation," U.S. Appl. No. 11/715,250, 21 pps, 2 pps drawings (2405), Filed Mar. 6, 2007.

Andreasen et al.,; "Policy-Based Control of Content Intercept", U.S. Appl. No. 11/715,251, 23 pps, 2 pps drawings (2401).

C. Rigney, et al. "Remote Authentication Dial in User Service (RADIUS)," RFC 2865, *The Internet Society*, Jun. 2000, 71 pgs., Jun. 2000.

USPTO, Office Action dated Dec. 4, 2008 for U.S. Appl. No. 11/715,056 in the name of Jonathan D. Rosenberg, 14 pages, Dec. 4, 2008.

PCT Notification of Transmittal of the International Search Report and the Written Opinion of the International Searching Authority, or the Declaration with attached PCT International Search Report and Written Opinion of the International Searching Authority in International Application No. PCT/US2006/046800, dated Nov. 10, 2008, 10 pages, Nov. 10, 2008.

Official Action dated Apr. 3, 2009 in U.S. Appl. No. 11/715,056, 16 pages, Apr. 3, 2009.

USPTO, Final Office Action dated Oct. 27, 2009 in U.S. Appl. No. 11/715,056, 12 pages, Oct. 27, 2009.

Communication from the State Intellectual Property Office of the People's Republic of China, The First Office Action, Filing No. 200780008341.1, transmitted to Baker Botts on Feb. 1, 2010, 8 pages.

The Patent Office of The People's Republic of China, The Second Office Action and Text of the Second Office Action, Application No. 200780008341.1, Chinese Office Action and English translation transmitted to Baker Botts L.L.P. on Oct. 21, 2010, 8 pages.

\* cited by examiner

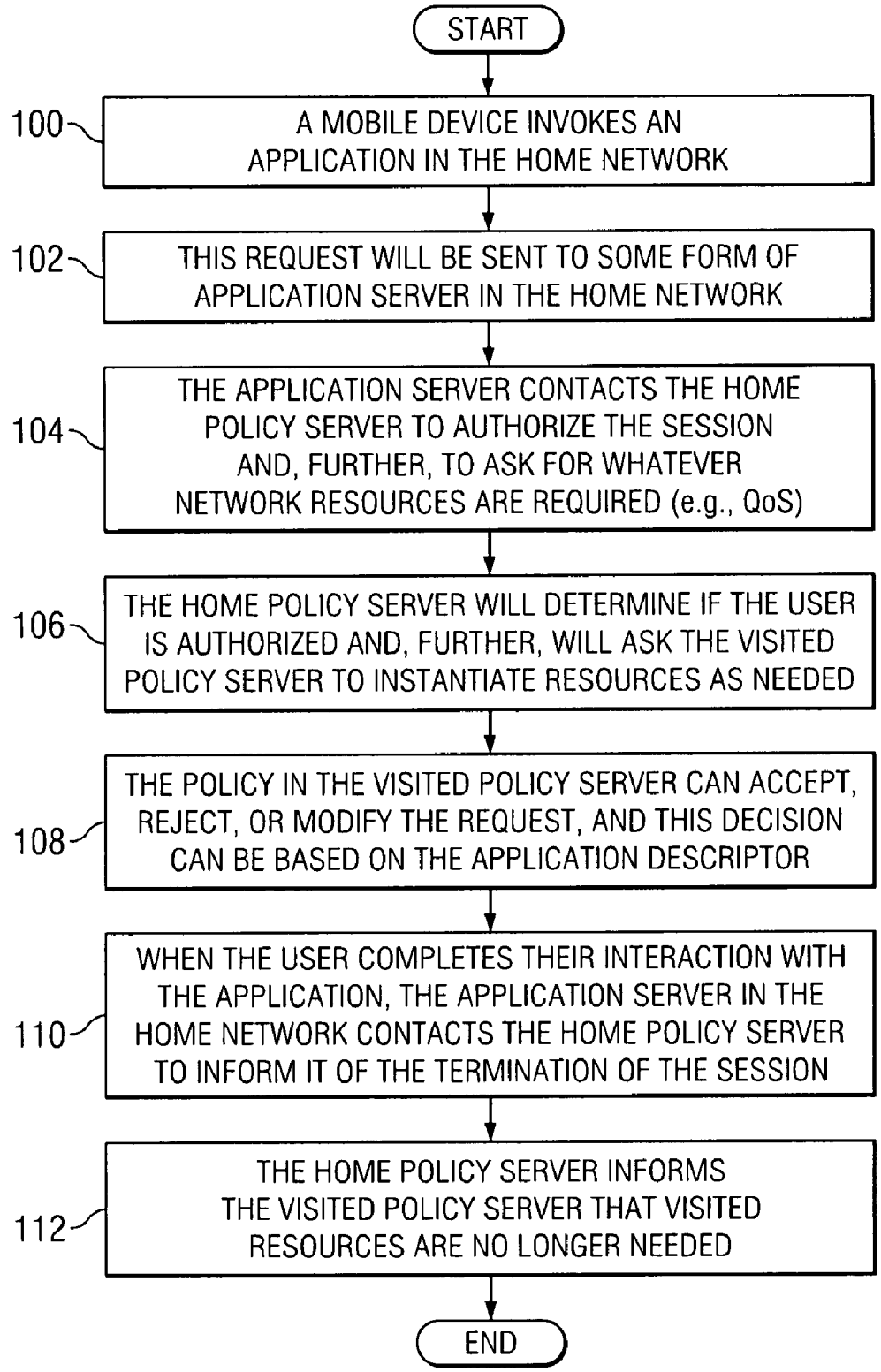

SYSTEM AND METHOD FOR NETWORK CHARGING USING POLICY PEERING

CROSS-REFERENCE TO RELATED APPLICATION

This Application claims priority under 35 U.S.C. §119 of provisional application No. 60/780,176 filed Mar. 6, 2006, entitled VERIZON WIRELESS MULTI-MEDIA PLUS (MMD+) PROGRAM SYSTEM ARCHITECTURE DOCUMENT. This Application also incorporates by reference that Provisional in its entirety.

TECHNICAL FIELD OF THE INVENTION

This invention relates in general to the field of communications and, more particularly, to a system and a method for network charging using policy.

BACKGROUND OF THE INVENTION

Networking architectures have grown increasingly complex in communications environments. In addition, the augmentation of clients or end users wishing to communicate in a network environment has caused many networking configurations and systems to respond by adding elements to accommodate the increase in networking traffic and the individualistic needs of new end users.

As the subscriber base of end users increases, proper routing and efficient management of communication sessions and data flows becomes even more critical. One significant area for any group of end users relates to billing. The problem is particularly troubling in mobile service provider network architectures, where devices can roam from network to network.

Existing solutions fail to properly account for billing. Mobile service providers have a desire to do service-based billing, where they bill the consumer and each other based on the service that is used by the subscriber. For example, IMS tries to provide for service-based billing for SIP services by including a P-CSCF in the visited network. However, this works only for SIP and fails in many cases where the SIP message alone cannot easily provide the identity of the service that the user is receiving. Other flawed architectures include RFC 3455, which defines P-Visited-Network-ID and the P-Access-Network-Info headers and associated procedures, but which fails to account for proper billing.

Thus, designing an effective billing mechanism for such roaming users provides a significant challenge to component manufacturers, system administrators, and network operators.

SUMMARY OF THE INVENTION

From the foregoing, it may be appreciated by those skilled in the art that a need has arisen for an improved communications approach that provides for an optimal service-based billing mechanism for one or more end users roaming in a network environment. In accordance with one embodiment of the present invention, a system and a method for providing billing functions in a communications environment are provided that greatly reduce disadvantages and problems associated with conventional techniques.

According to one embodiment of the present invention, an architecture for providing an optimal billing mechanism is provided that includes interfacing, by a home policy server residing in a home network of an end user, with a visited policy server in a visited network and with an application server, the application server contacting the home policy server when the end user elects to invoke an application in the home network. The application server contacting the home policy server to authorize a session and, further, to ask for required network resources for the session that are required and the application server passing a set of application descriptors to the policy server. The application descriptors being tokens that describe one or more characteristics of the application for policy and charging. The method further includes determining if the user is authorized and requesting the visited policy server to instantiate the network resources as needed.

In more specific embodiments, as part of messaging passed to the visited policy server, the home policy server includes a subset of the application descriptors, describing the application that is being utilized for the session. The visited policy server can accept, reject, or modify a request for the session, and wherein this decision can be based on one or more of the application descriptors. In other embodiments, the policy server in the visited network uses the application descriptors to learn the service in use by the subscriber and generate service-based billing records as a consequence.

In still other embodiments, when the end user completes their interaction with the application, the application server in the home network contacts the home policy server to inform it of a termination of the session. The home policy server informs the visited policy server that visited resources are no longer needed.

Some embodiments of the present invention may provide a number of technical advantages. For example, according to one embodiment of the present invention, a communications approach is offered that allows the visited network to know the application for which network resources are being consumed, so it can perform service-based billing. In addition, this works for any kind of application: not necessarily exclusive to SIP-based elements. Furthermore, the proposed architecture does not require the visited network to deploy any component of the application, or know anything about the application except for the opaque token that identifies or declares the actual application.

Note that certain embodiments of the present invention may enjoy some, all, or none of these advantages. Other technical advantages may be readily apparent to one skilled in the art from the following figure, description, and claims.

BRIEF DESCRIPTION OF THE DRAWINGS

To provide a more complete understanding of the present invention and features and advantages thereof, reference is made to the following description, taken in conjunction with the accompanying figures, wherein like reference numerals represent like parts, in which:

FIG. 3 is a simplified flowchart illustrating a simple flow according to the teachings of one embodiment of the invention.

DETAILED DESCRIPTION OF EXAMPLE EMBODIMENTS OF THE INVENTION

Figure 1:
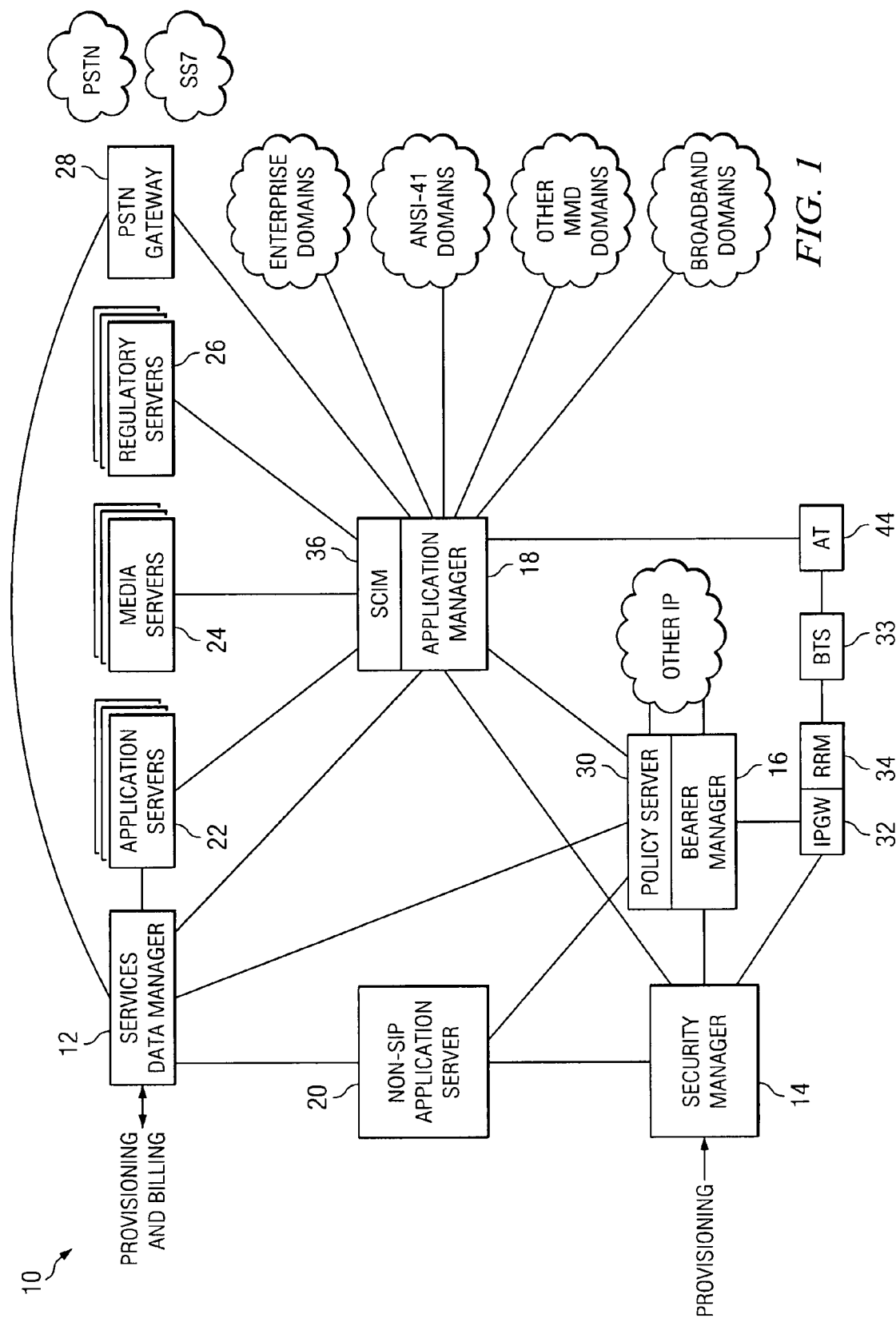
FIG. 1 is a simplified block diagram of a communications system for billing in a communications environment in accordance with one embodiment of the present invention.

FIG. 1 is a simplified block diagram of a communications system 10 for communicating data in a network environment and, further, for billing for a group of end users that may potentially roam between networks. Communication system 10 includes a services data manager to which provisioning and billing flow. A security manager 14 is also included in the system, as it is also tasked with provisioning. In addition, communication system 10 includes a bearer manager 16 (coupled to a policy server 30), an application manager 18 (coupled to a Service Capabilities Interaction Management (SCIM) element 36), a non-SIP application server 20, a group of application servers 22, a group of media servers 24, a group of regulatory servers 26, and a PSTN gateway, which is coupled to services data manager 12. Also included in communication system 10 are an IP gateway (IPGW) 32, a radio resource manager (RRM) 34, a base transceiver station (BTS) 33, and an access terminal (AT) 44. A number of clouds are also depicted in FIG. 1, illustrating various possible connectivity characteristics of the system.

FIG. 1, in this mobile network example, may be generally configured or arranged to represent a communication architecture, e.g., a 2.5G network applicable to a Global System for Mobile (GSM) environment in accordance with a particular embodiment of the present invention. However, the 2.5G architecture is offered for purposes of example only and may alternatively be substituted with any suitable networking protocol or arrangement that provides a communicative platform for communications system 10. For example, communications system 10 may cooperate with any version of a GPRS tunneling protocol (GTP) that includes application operations. This may be inclusive of first generation, 2G, and 3G architectures that provide features for application distribution. In another example, communications system 10 may cooperate with the Point-to-Point Protocol (PPP) that supports ads architectures providing features for application distribution.

Before turning to the exact operation of communication system 10, some preliminary background information is offered earnestly in order to set up some of the problems that exist in current architectures.

When a mobile user roams from the network of his home service provider to the visited network provider, the user is able to access services as a consequence of roaming agreements established between the home and visited operators. A key facet in the roaming agreement is billing. The subscriber pays their home network provider, but uses the resources of the visited network. Consequently, to get compensated, the visited network provider establishes a billing agreement with the home provider. These agreements can be varied, and include everything from a free service (uncommon), to a (more typical) per-minute or per-byte compensation model.

In a traditional PSTN, there was a single network supporting a single service, and it was easy to build arbitrary billing models between roaming partners. With the IP paradigm, the situation changes. There are now a wide variety of services that a user can access: web, email, IM, presence, voice, video conferencing, streaming TV, etc. These different services have different values to the users, and it is commonplace for the home network provider to charge differently for different services. For example, a streaming TV program might be charged per-show (e.g., 50 cents each show), messages per-message, and web traffic per-byte. The visited network provider will often want to be compensated in proportion to the value of the service as charged by the home operator.

The problem statement is: How does the visited operator perform differentiated charging for each service when those services are resident in the network of the home provider? One solution that has emerged in the context of IMS is for the visited network provider to deploy an IMS component: namely the P-CSCF. Through the P-CSCF, the visited network provider may be aware of the start and stop times for SIP calls, and could determine the number of minutes, media types, etc. However, this solution works only for SIP-based services. It also fails to differentiate between SIP sessions that utilize the same media types but are otherwise quite distinct (a conversational voice service and an audio streaming application, for example). Consequently, there is no ideal solution to this problem.

In accordance with one embodiment of the present invention, communication system 10 overcomes these deficiencies, as well as others in offering an optimal solution for roaming end users. One key idea of the proposed architecture is to allow the visited network to know the application in the home network that is being invoked. This is done by passing a descriptor of the application from the home to visited network during policy peering. This mechanism works for any application: whether SIP-based or not.

Such an approach would be advantageous, as it allows the visited network to know the application for which network resources are being associated, so it can do service-based billing. In addition, communication system works for any kind of application: not necessarily just SIP-based elements. Furthermore, the proposed architecture does not require the visited network to deploy any component of the application, or know anything about the application except for the opaque token that identifies or declares the application.

Note that communication system 10 can just use policy server peering to pass visited (roaming) network provider information and access network information to the home network. This data can be stored in the home policy server and can be used to implement roaming policies for not only SIP, but also non-SIP applications. The current architecture can use policy server peering and MIP messages to pass access network information to the home network. There, in the home network, such data is stored in the policy server and can be used as input to policy decisions for SIP and non-SIP applications.

Communication system 10 also enables the information to be made generally available for all relevant SIP and non-SIP entities.

Additional details related to specific flows are provided below with reference to FIGS. 2-3. Before turning to those discussions, however, some background information about the infrastructure of communication system 10 is offered for purposes of teaching. Following this brief description, existing systems are discussed in an effort to further explain some of the problems inherent to current networking architectures.

Access terminals (or ATs) are normally mobile devices, but the architecture provides for fixed device access as well. The terminals can access the network through a high-speed wireless data network, providing them with suitable IP connectivity. ATs can also access the network through CDMA or alternative mechanisms, such as WiFi or even 1xRTT data. In the case of EVDO Rev A, the RAN includes the RRM and the BTS. The RAN is responsible for providing layer-2 mobile access, Quality of Service (QoS) on the access network, mobility functions, and handoff services within the area of coverage for a particular RAN.

The RAN interfaces with the IPGW, which is the first IP component in the network. Its job, as the name implies, is to act as a gateway between the layer-2 RAN access and the IP layer-3 network. The IPGW is responsible for authentication of the mobile to the network. It accomplishes that through an EAP exchange with the mobile and the SM, which holds the keys. IPGW performs communications with the RAN using the A10, A11, and A12 interfaces defined in CDMA, handoff functions between RAN and between IPGW, and for facilitating registration of the mobile to the IP network, using Mobile IP v6 (MIPv6). MIPv6 is used as the primary mobility technology at layer-3, although the architecture does not change in any fundamental way with Mobile IPv4. The IPGW is also responsible for accounting and QoS functions for the packets it forwards.

Though the interfaces from the IPGW towards the RAN are RAN-specific, the interfaces from the IPGW towards the rest of the network are not. This allows for IPGW to be deployed whose access networks are based on other technologies, such as WiFi. Because the IPGW performs functions such as authentication, handoff, and context transfer in ways that are not access network specific, the network allows for roaming and handoff functions seamlessly across these different access network technologies.

Through the mobile IP registration procedures, the mobile can be connected to the Bearer Manager (BM), which acts as the IP anchor point and MIPv6 Home Agent (HA). Because of its role as the IP anchor point, the BM also serves as the natural enforcement point for a host of network policies, including QoS, accounting, and mobility. The BM also provides security functions, such as firewall, intrusion detection, and DDoS attack prevention. The BM provides Deep Packet Inspection (DPI) functions, which allow for detection of application layer traffic passing through the BM. The BM also acts as a repository for network presence, including the roaming states for the mobile, its cell site location, etc.

Co-resident with the BM is the Policy Server (PS), which is sometimes referred to as the Policy Manager (PM). The PS is responsible for implementing the operator policies that govern the way in which the underlying IP network (the IPGW, BM and RAN) is utilized in support of the applications that run on top of the network. To do that, the PS controls the BM and IPGW by providing it with policies, called facets, which the BM and IPGW execute. The PS is contacted by numerous elements in the network for decisions on how they should proceed, in cases where such decisions impact the underlying use of the IP network.

Since one of the primary purposes of the network is to support mobile voice services, the Session Initiation Protocol (SIP) plays a prominent role in the architecture. SIP is used between the mobile and the Application Manager (AM), which acts as the main SIP server in the network. The AM is responsible for basic SIP functions, such as SIP registration and SIP call routing. The AM provides the basic set of voice features, such as call forwarding and call screening. It is responsible for authorizing SIP calls to and from endpoints, and routing those calls to the right terminating component, whether it be another AM, a gateway to the PSTN, or a peer operator. The AM can use ENUM to facilitate the routing of calls between providers, and leverages configured routing tables to route calls to the PSTN. The AM is responsible for invocation of SIP-based application servers, which can provide services like IP centrex and Push-To-Talk. These application servers reside on top of the AM, and are accessed using the IMS Service Control (ISC) interface. The AM provides Service Capabilities Interaction Management (SCIM) functions, which perform feature interaction management amongst its internal features and ones invoked in application servers. The AM also interacts with the PS over a DIAMETER-based interface, informing it of SIP session requests so that the network can be properly configured to support those sessions in accordance with the providers policies. The AM also provides user presence services through SIP for Presence and Messaging Leveraging Extensions (SIMPLE).

Communication system 10 supports two different types of applications. One type is SIP-based applications. These application servers (AS) reside on top of the AM, using the ISC interface, and are invoked using SIP-based interactions. Communication System 10 also supports non-SIP applications. These applications are invoked directly by the AT (or through other triggers). However, access to these applications and coordination of underlying network resources in support of those applications is managed by the PS, to which the application server communicates. Indeed, the communications interface between the non-SIP AS and the PS is identical to the one between the AM and PS and can be based on DIAMETER.

Application servers can frequently need access to media processing functions, such as Interactive Voice Response (IVR), mixing functions, and messaging functions. Rather than have each application server implement these functions separately, they are extracted into a common set of servers, called media servers. These media servers represent coarse-grained application components that are not useful applications by themselves, but are useful when used by other applications. These servers are also known as service enablers.

Nearly all of the components in the network interface to the Security Manager (SM), also using a DIAMETER application, for example. The SM is the central access point for security services in the network. Authentication at all layers takes place through interactions with the SM, since the SM acts as the central repository and generation point for keying materials. The SM is the core of the Security Operations Center (SOC), which provides continuous management of threats in the network. The SM coordinates with the rest of the network to provide intrusion detection, network infrastructure security, establishment of traffic baselines, anomaly detection, etc. The SM owns the security policy for the network, pushing that security policy to various components, separately from the PS. This provides a clean separation between security and functional policies. The SM also performs posture assessment on mobiles, determining whether they can be permitted on the network, and with access to which services, based on the compliance of the mobile to standards for software compliance (such as OS versions, anti-virus versions, etc.).

The Services Data Manager (SDM) acts as the central repository of subscriber data in the network. All components needing access to subscriber data, including AM, PS and application servers, obtain this data from the SDM, also using a DIAMETER application. Since numerous protocols and devices are used in the network, each with potentially different identifiers, the SDM acts as the repository for the subscriber data model, and is able to relate together the various identifiers used within the system. The SDM provides basic Create/Read/Update/Delete (CRUD) services on the data, and is responsible for highly reliable storage of the data. Caching is used extensively and SDM is responsible for providing network elements of updates to the data so that caches can be updated or invalidated. The SDM also serves as the repository of accounting records for subscriber usage on the network. These records are read by back-end billing systems for correlation and billing. The SDM also stores various pieces of non-subscriber data, such as PSTN routing logic. Provisioning systems interface with the SDM, pushing subscriber data into it and reading it out.

Interconnection with the PSTN is accomplished through traditional SIP-based PSTN gateways, whether composed or decomposed. The regulatory server provides an interface for installation of intercept orders from law enforcement agencies, and the collection of data from the network for delivery to law enforcement agencies.

In current IMS-based architectures, part of the role of the I-CSCF and HSS is to authorize registrations. When a mobile registers, the P-CSCF inserts a P-Visited-Network-ID header [e.g., see RFC 3455] into the SIP REGISTER message identifying the visited network provider. The I-CSCF in the home network receives the REGISTER, extracts this header and passes it to the HSS. The HSS authorizes that this visited network identity is a valid roaming partner and that the user is authorized to roam there, and informs the I-CSCF of the result. The I-CSCF forwards the REGISTER to the S-CSCF if authorized, or rejects the request if not.

This mechanism suffers the drawback that it applies to roaming authorization for SIP only, and that it furthermore can only be used for registrations. There is no way to authorize the registration, but deny calls due to the identity of the roaming partner, or to authorize registrations of one or more other applications.

Similarly, TIA-835-D defines the Carrier-ID RADIUS attribute, which can be provided by the visited network AAA infrastructure to the home network AAA infrastructure during access network authentication in the visited network. This enables the home network to implement roaming restrictions at the network layer, however this suffers from limitations that are analogous to the current IMS solution. In particular, it does not allow for roaming restrictions to be applied at the application level: either the user endpoint is allowed access (and roaming access to all applications is inherently granted) or it is not (and access to all applications is inherently prohibited).

A second, but related, problem deals with access network information, which includes the type of network as well as location information for the user endpoint. In the IMS architecture, the P-CSCF conveys information about the type of network, cell location, etc in SIP messages towards the home network by use of the P-Access-Network-Info header [RFC 3455]. However, this mechanism applies to SIP only. It also presumes the existence of SIP messaging whenever such information changes, which is not always the case.

Communication system 10 addresses these problems, as well as others, in providing a generic solution to the problems cited above. In essence, communication system leverages the notion that, in order to allow for different applications to have and to enforce different roaming agreements, policy and policy server peering is used instead of the IMS or legacy AAA infrastructure. Details about the proposed architecture are outlined below with reference to FIGS. 2 and 3.

Figure 2:
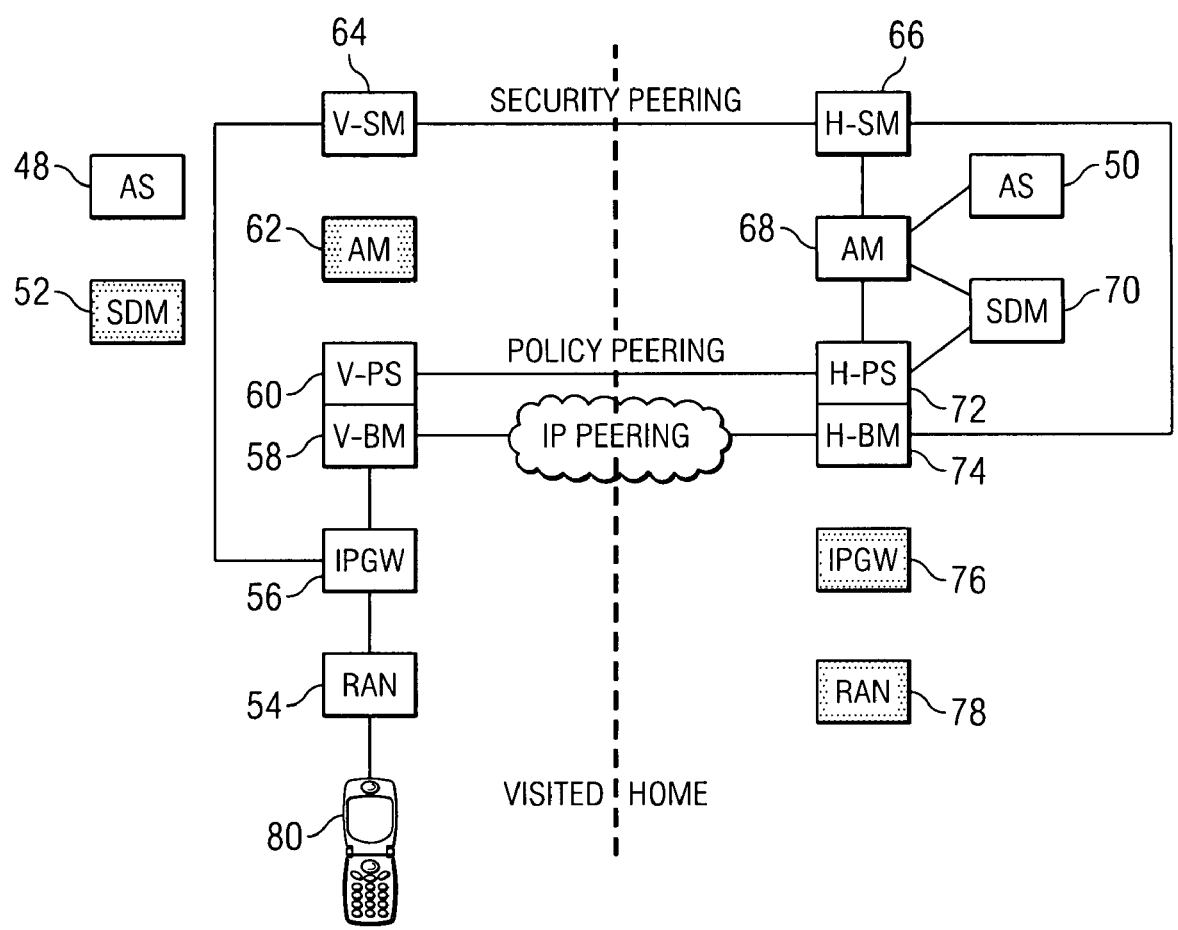
FIG. 2 is a simplified block diagram illustrating a more comprehensive example implementation of one potential embodiment of the present invention.

FIG. 2 is a simplified block diagram illustrating additional details associated with an example roaming architecture and, further, offers a simple arrangement according to the teachings of one embodiment of the invention. FIG. 2 depicts another example environment in which the present invention can operate. This FIGURE is slightly more comprehensive and, accordingly, includes a number of components that are not necessarily required to implement the present invention.

FIG. 2 includes a home and a visited network. Therefore, FIG. 2 often includes similar components residing in each network, such as: services data managers 52, 70, RANs 54, 78 IPGWs 56, 76, bearer managers 58, 74, and policy servers 60, 72 that execute policy peering. FIG. 2 further includes security managers 64, 66 that perform security peering, application managers 62 and 68, application server 48 and 50, and a mobile station 80.

Software and/or hardware may reside in policy server (60 or 72) and/or bearer managers (e.g. 58 or 74) in order to achieve the teachings of the features of the present invention. For the Mobile IP part of the concept, the bearer manager adds the information in the MIP messages being sent by the V-BM to the H-BM. The V-BM in turn learns about the access network information from the IPGW.

Note that, due to their flexibility, these components may alternatively be equipped with (or include) any suitable component, device, application specific integrated circuit (ASIC), processor, microprocessor, algorithm, read-only memory (ROM) element, random access memory (RAM) element, erasable programmable ROM (EPROM), electrically erasable programmable ROM (EEPROM), field-programmable gate array (FPGA), or any other suitable element or object that is operable to facilitate the operations thereof. Considerable flexibility is provided by the structure of policy server (60 or 72) and/or bearer managers (e.g. 58 or 74) in the context of communications system 10 and, accordingly, they should be construed as such.

It should be noted that the internal structure of the system of FIG. 2 is versatile and can be readily changed, modified, rearranged, or reconfigured in order to achieve its intended operations or additional operations. Additionally, any of the items within FIGS. 1 and 2 may be combined, where appropriate, or replaced with other functional elements that are operable to achieve any of the operations described herein.

The discussed accounting framework enables the BM/PS in the visited network to collect and report the information to the visited accounting server. The home network collects all the accounting information for the traffic via the home network, as well as the sessions under home control. When a user roams into a visited network, initial access authentication is performed, and at the end of access authentication, the visited network is allocated a bearer correlation identifier by the home network, corresponding to the MIP session.

All the billing records related to the MIP session (as opposed to dynamic application sessions), which are sent to the V-SDM and the H-SDM, contain the bearer correlation identifier. This identifier is then used for any offline settlements, across the visited and home providers.

For dynamic sessions, the correlation identifier is assigned in the home network, as described above. The PS passes this identifier to the visited network through the policy peering interface, as part of the accounting facets passed inter-provider. The application descriptors are also passed inter-provider through the policy peering interface. At the end of the IP session, the PS can de-install the facets that were created at the start of the session. The response to this de-installation can include the final values of the counters associated with the accounting facets, and the service as identified by the application descriptors. This allows the home network to immediately learn about resource usage in the visited network. In addition, accounting records sent from the V-PS to its SDM, accounting for visited network usage, can include the home-allocated correlation identifier. This allows the home and visited networks to reconcile detail records periodically as needed.

In regards to mobility, the policy server can make many decisions and install various facets related to mobility. Some of the decisions made by the PS include Roaming Authorization. When a subscriber roams, the PS can decide if the roaming operation is allowed. This can be based on the roaming partner, applications running for the subscriber, etc. A roaming authorization decision is made at the time of an IP-address assignment, Proxy Mobile IP registration or MIP registration, at which point the BM can ask the PS for a decision. Roaming policies can also be outsourced via facets installed into the BM at registration time.

The Mobility facets include Roaming. For example, instead of making a decision on roaming events as a subscriber moves, the policy server can compute a roaming facet and hand it to the BM. The roaming facet specifies, based on the identity of the roaming partner, whether or not roaming is permitted. Roaming facets can be used only when roaming decisions do not require any knowledge except for the identity of the roaming partner (and the subscriber identity of course).

Policy contexts are the set of states that the policy server uses to make decisions. A policy context can be thought of as a set of variables that the policy rules can check through comparisons (equality, greater-than, not-equal-to, etc.). There are generally two types of policy contexts: local or remote. A local policy context is a policy context that is actively stored and maintained by the PS. Events passed to the PS through questions from elements, or through simple event reports, update these policy contexts. Examples of local policy contexts include the set of SIP applications currently running (passed to the PS from the AM when it asks about proceeding with an application), the roaming network in which a subscriber resides (passed to the PS from the BM during MIP registration), and the time of day. Remote policy contexts are variables that, for various reasons, are not stored on the PS, but that the PS can "read" by doing a query to fetch the current value. One example of such a variable is the admission decision made in the RAN for a QoS request from the subscriber. These QoS requests are processed locally at the RAN, and the results told to the IPGW. They are not passed to the PS unless the authorization envelope has been exceeded. Another is the mode of the mobile, active or dormant. This information is also not normally passed to the policy server, unless an explicit request has been made by the PS to be informed of these changes. Much like configuration, policy contexts span mobility, access and connectivity, QoS, DPI, and accounting. They also include security and application policy contexts.

Mobility policy contexts can include Roaming Network Identity, which is the identity of the visited network provider. This is a local policy context, and is learned through both the access network login and the MIP registration process, where it is passed to the PS from the SM and BM respectively. The policy contexts can also include location. The location of the subscriber can be expressed as the serving IPGW and the serving cell identifier. The location helps in handling policies, which could indicate, whereby certain applications may be allowed only in certain regions for the subscriber. This is passed to the BM during IP-address assignment, Proxy Mobile IP or MIP registrations, and made available to the PS. The policy contexts can also include Subscriber Mode: active or idle or dormant, out of coverage. This is a context that is learnt via periodic updates about the subscriber.

Access policy contexts include Access Technology: the underlying technology used by the mobile, whether it is WiFi, 1xRTT, EVDO or others. This can be learned from the IPGW.

The location information regarding a subscriber can be structured into several parameters: the visited network, the region, the serving cell-identifier, the access-network type, and the geographic location of the subscriber in latitude/longitude. Information such as the cell-identifier is generally available and may be used towards the location of the subscriber, but it is very dependant on the cell size, the radius of coverage. The physical location information can be improved by additional techniques. The physical location of the subscriber depends on the type of device as well as the technology to identify the exact location. The location retrieval can occur via GPS enabled devices, or using network based techniques. GPS enabled devices can be queried to report the GPS information, and this information can be available regardless of the type of access (EVDO, WiFi, fixed network).

A location application can obtain information in two ways: by querying a mobile client directly, or by requesting the network. The location application can query GPS enabled devices directly to report the location information. In the absence of this information or to assist the information received via GPS, network based techniques can also be used. Network based techniques such as AFLT can be performed by the RAN, and this information can be reported to the network/location presence server in the BM. The location application can query the network/location presence server in the BM to request the location information for a given subscriber. The BM in turn sends this query to the RAN via the IPGW and obtains triangulation-based results for a subscriber. This information is then returned to the location application, along with additional network presence information.

The Bearer Manager can provide an open interface over which location, such as cell site for example, and presence information is made available.

Before turning to an example flow for communication system 10 in a given network, some preliminary information about a typical roaming protocol is provided. It is imperative to provide some overview as to the way in which the following invention operates. The following foundational information may be viewed as a basis from which the present invention may be properly explained. Such information is offered earnestly for purposes of explanation only and, accordingly, should not be construed in any way to limit the broad scope of the present invention and its potential applications.

When a user roams, some of the components of the architecture "split." For each split component, some processing is being contributed by an instance of that component in the visited network, and some processing is being contributed by an instance in the home network. In communication system 10, the BM/PS and SM are split. The IPGW resides entirely in the visited network, and the SDM and AM reside entirely in the home network. In some cases, there may be local services provided in the visited network; those would involve the usage of an application server that resides entirely in the visited network.

The basic roaming procedure is as follows. The AT connects to the RAN in the visited network, and connects to its IPGW as its point of attachment. The IPGW proceeds to authenticate the AT using EAP procedures. The IPGW_passes the identity asserted by the mobile to the Visited SM (V-SM). The V-SM has no relationship with the subscriber. However, the identity of the subscriber is of the form user@domain. As such, the V-SM uses the domain part of the identifier to locate an SM in the home domain of the subscriber (the H-SM). This H-SM can either directly authenticate the client, and if not (because the client is served by a different H-SM), it can route the messaging to the correct H-SM. Authentication then proceeds as normal. At the end of the exchange, the IPGW knows the identity of the device, and if the device is integrated, of the subscriber. The EAP exchange can also provide the IPGW with the identity of several key services in the home network, including the BM and AM assigned to the subscriber in the home network.

At this point, the client obtains an address in the visited network. This may be obtained by the client using DHCP. The IPGW, on receipt of the DHCP query, uses ProxyMIP, and obtains an IP address from a V-BM. The IPGW selects a V-BM based on visited network policies. Since the visited network has no relationship with the subscriber, those policies are never subscriber specific. The V-BM contacts the V-PS for a policy decision regarding the registration. The V-PS contacts the H-PS for the subscriber by use of policy server peering, and includes the visited network identity and possibly access network information as part of the request. The H-PS can now make a policy decision based on the visited network identity, and possible access network information as well.

If the H-PS allows the registration request in the visited network, it informs the V-PS of this, which in turn informs the V-BM of this. The V-BM then sends a ProxyMIP response to the IPGW, which includes the assigned IP-address. Once the IPGW obtains an address from the V-BM, this address is then provided to the AT in the DHCP response. The AT then proceeds with mobile IP procedures to obtain an address from the home BM. The AT can register its visited address (which it obtained via DHCP) as the point-of-attachment to the home BM. The MIP procedures require the mobile (in the case of IPv6) or the IPGW (in the case of IPv4) to provide the address of the H-BM.

This identity was passed to the IPGW during the EAP authentication process, and then passed to the mobile in the DHCP reply. The V-BM can also pass other bootstrapping parameters to the AT in the DHCP reply. For example, the address of a configuration server for learning local dial plans is provided in the DHCP reply. When the AT sends the MIP request, the IPGW may append access network information to it, and the V-BM may append access network information and visited network identity information to the message, before forwarding it the H-BM. The H-BM upon receiving the MIP message interacts with the H-PS, and the H-BM may provide the supplied access network information and visited network identity information to the H-PS as part of this process, thereby enabling the H-PS to use this information for this and other policy requests related to the IP session.

By registering the visited address as the point-of-attachment, the bearer path towards the home BM can include the V-BM. This has the benefit of hiding mobility within the visited network from the home BM. MIP binding updates may not be needed until the AT moves to a different provider network entirely. This localization of mobility improves the performance of the network and reduces the load on the BM.

The H-BM can authenticate the mobile IP registration. That authentication can, for integrated clients, be based on keys derived from the EAP authentication; otherwise, it is based on a shared secret provisioned into the device for purposes of MIP authentication. In either case, the H-BM interacts with the H-SM to authenticate the MIP registration.

Both the V-BM and H-BM can contact their respective policy servers to obtain policies that apply to the subscriber. Obtaining these policies involves the usage of policy server peering.

Once the MIP registration terminates, then the mobile proceeds with SIP registration. The SIP REGISTER message is sent directly from the AT to the AM, which resides in the home network. The AT can know the AM address as a consequence of DHCP. If the AT is not integrated, its AM is known through configuration, since the AM is statically assigned to the subscriber. These procedures are equally applicable to IPv6 (in which case MIPv6 and PMIPv6 are used) and IPv4 (in which case PMIPv4 is used).

With regards to the roaming procedures, for Mobile IPv6, as part of the access authentication process, the Home Bearer Manager address is provided to the IPGW by the H-SM. The client receives a Visited Address via a DHCP exchange with a IPGW associated with its point of attachment. The assigned address is taken from a subnet that is 'homed' on a bearer manager in the same region as the IPGW where the client is attached. The Visited Bearer Manager is chosen based on regional configuration in the visited network. This address is termed the Visited Address. It is this address that is used as the Care of Address when establishing a mobility binding with a Home Bearer Manager.

Prior to informing the device of the Care of Address and the Home Bearer Manager, Proxy MIPv6 procedures are used to establish a bidirectional tunnel between the Visited Bearer Manager and the IPGW. This allows the Visited Bearer Manager to forward traffic destined to a given Care of Address via the correct IPGW. As a client's point of attachment changes, Proxy MIPv6 procedures are used to re-register the client via the new point of attachment.

When the PMIPv6 procedures are complete, the DHCP response, containing the Visited Address, Home Bearer Manager address, and home AM address is sent to the client. The IPv6 client then initiates a MIPv6 binding with the Home Bearer Manager. The Care of Address supplied in the MIPv6 Binding Request is the address assigned to the client by the Visited Bearer Manager. This binding initiation is routed to the Home Bearer Manager via the Visited Bearer Manager. The Home Bearer Manager authenticates the subscriber identifier with the H-SM. Successful authentication results in the Home Bearer Manager sending a Binding Acknowledgement and assigning an IPv6 address to the client from a subnet 'homed' at the Home Bearer Manager. Subscriber policy can be fetched at this time.

As the Care of Address is owned by the Visited BM, the binding response can be routed to the Visited BM from the Home BM. The previous PMIPv6 sequence ensures that the Visited BM can forward the Binding Acknowledgement to the client via the correct IPGW.

The device now has an IPv6 address assigned by the Home Bearer Manager and an IPv6 Care of Address associated with the Visited Bearer Manager. A tunnel exists between the Visited Bearer Manager and the IPGW to ensure that the Visited Bearer Manager can 'see' the bearer and control paths and can enforce visited network policy. For Mobile IPv4, the steps taken are very similar to those for the IPv6 client. Indeed, it is an objective of the design that the architecture not fundamentally differ between v4 and v6. A Home Bearer Manager for the client is assigned as part of the Access Authentication procedures. A visited address is assigned using DHCP procedures, a tunnel is established between the IPGW and Visited Bearer Manager using Proxy registration techniques and then a mobility binding established between the client and a Home Bearer Manager, Similar to the IPv6 case, DHCP is used for visited address assignment.

The authentication steps are identical to those for MIPv6. Following successful access authentication, a Proxy Registration establishes a mobility binding with the Visited Bearer Manager on behalf of the client. The Visited Bearer Manager is chosen based on regional configuration. The Visited Bearer Manager assigns an IP address to the client, this being returned to the IPGW as part of mobility binding establishment.

The AT sends a DHCP Discover message to the IPGW, and the Visited Address is provided to the client in a DHCP Acknowledgement message. The DHCP acknowledgement can also contain the Home BM address and the home AM address. The Visited Bearer Manager sends a Foreign Agent Advertisement to the client via the IPGW.

The receipt of the Foreign Agent advertisement informs the client that the Foreign Agent for MIPV4 registration can be the V-BM. The client sends a MIPv4 Registration Request containing the Subscriber ID to the V-BM via the IPGW. The Registration Request is addressed to the V-BM. The Home Agent address field contains the address of the Home Bearer Manager identified in the DHCP Acknowledgement.

The V-BM, functioning as a MIPv4 Foreign Agent, sends the Registration Request to the Home Bearer Manager. The Care-of-Address in the MIPv4 Registration Request is the address of the Visited Bearer Manager. As the client has been assigned an address for which the Visited Bearer Manager acts as the Foreign Agent, all packets destined to the client traverse the Visited Bearer Manager. Hence, visited network policy can be applied at the Visited Bearer Manager. All traffic sent from the client is sent to the Visited Bearer Manager via the tunnel established between the IPGW and Visited Bearer Manager using the Proxy Mobility Registration procedures described above. This ensures that all traffic from the client is subject to visited network policy.

Layer-3 authentication of the Subscriber based on the subscriber ID is performed at the Home Bearer Manager, where a Home Address is assigned. The Home Address is returned in the MIPv4 Registration Reply, and that reply is sent to the Care-of-Address contained in the MIPv4 Registration Request. The Registration Reply is sent to the IPGW from the visited Bearer Manager and forwarded to the client. As a result of the Registration Request/Reply exchange, a path is established between the Home Bearer Manager and the Client. This path comprises a sequence of fixed paths, a Home Bearer Manager—Visited Bearer Manager path, the Visited Bearer Manager—IPGW path and the IPGW—Client path.

The device has an IPv4 address assigned by the Home Bearer Manager and an IPv4 Visited Address associated with the Visited Bearer Manager. A tunnel exists between the Visited Bearer Manager and the IPGW to ensure that the Visited Bearer Manager can 'see' the bearer and control paths and can enforce visited network policy Turning now to the features of the present invention, FIG. 3 is a simplified flowchart that addresses a basic example call flow for one embodiment of the present invention. In this example, it is assumed the home and visited networks deploy policy servers. These policy servers establish a peering relationship with each other when the roaming agreement is established.

The flow begins at step 100, where a mobile device invokes an application in the home network (e.g., IPTV or a voice call). This request can be sent to some form of application server in the home network, which can be SIP-based or non-SIP. This is illustrated by step 102. At step 104, the application server contacts the home policy server to authorize the session and, further, to ask for whatever network resources are required (e.g., QoS). When it does this, it passes a set of application descriptors to the policy server that are known as application facets. These are tokens that describe the characteristics of the application relevant for policy and charging.

At step 106, the home policy server can determine if the user is authorized and, further, can ask the visited policy server to instantiate resources as needed. As part of the messaging passed to the visited policy server, the home policy server includes a subset of the application descriptors, describing the home application that is being utilized for the session. At step 108, the policy in the visited policy server can accept, reject, or modify the request, and this decision can be based on the application descriptor.

When the user completes their interaction with the application at step 110, the application server in the home network contacts the home policy server to inform it of the termination of the session. The home policy server in turn informs the visited policy server that visited resources are no longer needed. This is illustrated as step 112.

Because of this exchange, the visited network can be aware of the start and stop of an application on its network, the network resources utilized for the session (QoS or security services for example), and the tokens that identify the application that utilized the session. As part of the roaming agreement established between the two providers, the home network provider can tell the visited network provider the values of the application descriptors for the applications on its network (for example, "Push-To-Talk", "IPTV" and "Video-Phone"). This can allow the visited network to know the application and request compensation based on that application.

It is a recognized issue with this mechanism that it relies on the visited network trusting the home network to properly identify and convey the application. However, this problem exists in the current IMS solution for the few applications it even works with: since the signaling is ultimately interpreted by the mobile device (owned by the home network) and the servers in the home network, they can use SIP signaling to set up sessions for other applications. Thus, the proposed solution improves upon the existing IMS solution by at least allowing a much broader set of applications to work.

Some of the steps discussed with reference to FIGURE may be changed or deleted where appropriate and additional steps may also be added to these process flows. These changes may be based on specific communication architectures or particular interfacing arrangements and configurations of associated elements and do not depart from the scope or the teachings of the present invention. For example, instead of contacting the application server first, the mobile device can request network resources from the visited network, which is to be authorized by the visited policy server. The visited policy server can ask the home policy server to authorize this, and the home policy server can make a decision and then return, in the authorization response, the application descriptors for the session. This is a "pull" variation on the steps in FIG. 3.

Although the present invention has been described in detail with reference to particular embodiments, communications system 10 may be extended to any scenario in which end user 12 is provided with call options in the context of a wired or a wireless connection or coupling. This may also be extended to any other network signaling protocols to achieve the teachings of the present invention.

Moreover, significant flexibility is provided by communications system 10 in that any suitable one or more components may be replaced with other components that facilitate their operations.

Additionally, although described in specific environments and contexts, the present invention could be used in countless applications. Numerous other changes, substitutions, variations, alterations, and modifications may be ascertained by those skilled in the art and it is intended that the present invention encompass all such changes, substitutions, variations, alterations, and modifications as falling within the spirit and scope of the appended claims. Moreover, the present invention is not intended to be limited in any way by any statement in the specification that is not otherwise reflected in the appended claims.

What is claimed is:

1. An apparatus for service-based billing in a network environment, comprising:
   a home policy server residing in a home network of a mobile station and configured to:
   interface with a visited policy server in a visited network over a policy peering interface, and with an application server, the application server in the home network, engage in contact with the application server when an application of the application server in the home network is invoked from the visited network, the application invoked using network resources of the visited network without the visited network knowing the application provided by the home network, receive a set of application descriptors from the application server, the application descriptors describing one or more characteristics of the application relevant for charging, the application descriptors identifying the application, and send the application descriptors to the visited policy server over the policy peering interface in real-time when the application is invoked, the application descriptors informing the visited network of the application provided by the home network.

2. The apparatus of claim 1, wherein the home policy server is used in a push scenario in which a mobile device requests network resources from the visited network.

3. The apparatus of claim 1, wherein the application is a selected one of a group of applications, the group consisting of:
   a) E-mail;
   b) Instant Messaging;
   c) Presence;
   d) Voice;
   e) Video conferencing; and
   f) Streaming television.

4. The apparatus of claim 1, wherein an invocation of the application is SIP-based or non-SIP based.

5. The apparatus of claim 1, wherein, as part of messaging passed to the visited policy server, the home policy server includes a subset of the application descriptors, describing the application that is being utilized for the session.

6. The apparatus of claim 1, wherein the visited policy server can accept, reject, or modify a request for the session based on one or more of the application descriptors.

7. The apparatus of claim 1, the home policy server further configured to:
   engage in contact with the application server at termination of the session, and
   inform the visited policy server that visited resources are no longer needed.

8. The apparatus of claim 1, the home policy server further configured to:
   receive contact from the visited policy server requesting authorization in response to the end user requesting resources, and
   provide information to the visited policy server relevant for billing.

9. A method for service-based billing in a network environment, comprising:
   interfacing, by a home policy server residing in a home network of a mobile station, with a visited policy server in a visited network over a policy peering interface, and with an application server, the application server in the home network,
   engaging in contact with the application server when an application of the application server in the home network is invoked from the visited network, the application invoked using resources of the visited network without the visited network knowing the application provided by the home network,
   receiving a set of application descriptors from the application server, the application descriptors being tokens that describe one or more characteristics of the application for charging, the application descriptors identifying the application, and
   sending the application descriptors to the visited policy server over the policy peering interface in real-time when the application is invoked, the application descriptors informing the visited network of the application provided by the home network.

10. The method of claim 9, wherein the application is a selected one of a group of applications, the group consisting of:
    a) E-mail;
    b) Instant Messaging;
    c) Presence;
    d) Voice;
    e) Video conferencing; and
    f) Streaming television.

11. The method of claim 9, wherein an invocation SIP-based or non-SIP based.

12. The method of claim 9, wherein, as part of messaging passed to the visited policy server, the home policy server includes a subset of the application descriptors, describing the application that is being utilized for the session.

13. The method of claim 9, wherein the visited policy server can accept, reject, or modify a request for the session based on one or more of the application descriptors.

14. The method of claim 9, further comprising:
    engaging in contact with the application server at termination of the session, and
    informing the visited policy server that visited resources are no longer needed.

15. The method of claim 9, further comprising:
    receiving contact from the visited policy server requesting authorization in response to the end user requesting resources, and
    providing information to the visited policy server relevant for billing.

16. The method of claim 9, server is used in a push scenario in which a mobile device requests network resources from the visited network.

17. Software for optimizing service-based billing in a network environment, the software being embodied in a non-transitory computer readable medium and comprising code such that when executed is configured to:
    interface, via a home policy server residing in a home network of a mobile station, with a visited policy server in a visited network over a policy peering interface, and with an application server, the application server in the home network,
    engage in contact with the application server when an application of the application server in the home network is invoked from the visited network, the application invoked using resources of the visited network without the visited network knowing the application provided by the home network; and
    receive a set of application descriptors from the application server, the application descriptors being tokens that describe one or more characteristics of the application for charging, the application descriptors identifying the application, and
    send the application descriptors to the visited policy server over the policy peering interface in real-time when the application is invoked, the application descriptors informing the visited network of the application provided by the home network.

18. The medium of claim 17, wherein the application is a selected one of a group of applications, the group consisting of:
   a) E-mail;
   b) Instant Messaging;
   c) Presence;
   d) Voice;
   e) Video conferencing; and
   f) Streaming television.

19. The medium of claim 17, wherein the invocation is SIP-based or non-SIP based.

20. The medium of claim 17, wherein, as part of messaging passed to the visited policy server, the home policy server includes a subset of the application descriptors, describing the application that is being utilized for the session.

21. The medium of claim 17, wherein the visited policy server can accept, reject, or modify a request for the session based on one or more of the application descriptors.

22. The medium of claim 17, the home policy server further configured to:
   engage in contact with the application server at termination of the session, and
   inform the visited policy server that visited resources are no longer needed.

23. The medium of claim 17, the home policy server further configured to:
   receive contact from the visited policy server requesting authorization in response to the end user requesting resources, and
   provide information to the visited policy server relevant for billing.

* * * * *